United States Patent [19]

Boehling et al.

[11] Patent Number: 5,229,702
[45] Date of Patent: Jul. 20, 1993

[54] POWER SYSTEM BATTERY TEMPERATURE CONTROL

[76] Inventors: Daniel E. Boehling, 1601 Oakengate La., Midlothian, Va. 23113; Richard L. Boehling, Jr., 4511 Fitzhugh Ave., Richmond, Va. 23226

[21] Appl. No.: 721,198

[22] Filed: Jun. 26, 1991

[51] Int. Cl.⁵ .................... H02J 7/00; H02J 9/00; F25B 21/02
[52] U.S. Cl. .......................... 320/2; 62/3.6; 307/66; 320/35; 429/120
[58] Field of Search ............. 62/3.6, 3.61, 3.7; 429/62, 120; 320/35, 2; 307/66

[56] References Cited

U.S. PATENT DOCUMENTS

| | | | |
|---|---|---|---|
| 2,978,875 | 4/1961 | Lackey et al. | 62/3 |
| 3,118,285 | 1/1964 | Malaker et al. | 62/3 |
| 3,137,142 | 6/1964 | Venema | 62/3 |
| 3,213,630 | 10/1965 | Mole | 62/3 |
| 3,500,650 | 3/1970 | Mole | 62/3 |
| 3,732,702 | 5/1973 | Desch | 62/3.6 |
| 3,973,938 | 8/1976 | Szabo et al. | 62/3.6 |
| 3,986,337 | 10/1976 | Richard | 62/3 |
| 4,644,753 | 2/1987 | Burke | 62/3.6 |
| 4,751,398 | 6/1988 | Ertz, III | 307/66 |
| 4,807,441 | 2/1989 | Agee et al. | 62/3 |
| 4,823,544 | 4/1989 | Trachteberg et al. | 62/3.61 |
| 4,999,576 | 3/1991 | Levinson | 307/66 X |

OTHER PUBLICATIONS

The Virginia Engineer, Jun. 1991, p. 12.
Engineering Specification of Power Battery, Inc. Paterson, N.J. pp. 11,12, Jan. 4, 1988.

Primary Examiner—R. J. Hickey
Attorney, Agent, or Firm—John F. C. Glenn

[57] ABSTRACT

Protection of rechargeable battery in power system by placing it in insulated chamber under temperature control of thermoelectric devices operated by the power system to pump heat out of the chamber or by the battery to pump heat into the chamber.

6 Claims, 4 Drawing Sheets

POWER SYSTEM BATTERY TEMPERATURE CONTROL

BACKGROUND OF THE INVENTION

Stand-by lighting units are used to light adjacent areas when a power line loses power. Such units conventionally have batteries which power the units' lamps when the connected power line is out. The units are exposed to elevated ambient temperatures and these often shorten the service lives of the batteries and thus cause considerable expense.

While an electrically operated compressor type vapor phase refrigerated enclosure could be used to accomplish the cooling of a battery to its optimum rated performance temperature, there are certain applications where such systems do not perform well or are not permitted. As temperatures rise above ambient, the performance of electric motors, compressors, and controls become increasingly inhibited, and less dependable in proportion to the temperature rise. Furthermore, the use of mechanical methods of any type for cooling emergency lighting system batteries in high temperature environments in nuclear power plants is hampered by mechanical unreliability and U.S. Nuclear Regulatory Commission regulations. The absolute necessity for dependable performance is so demanding under USNRC guidelines that there is serious concern about use of mechanical devices of any form, including cooling fans, to assist in improving battery life expectancy in certain areas of nuclear powered electrical generating plants. This also applies to non-mechanically driven vapor phase gas refrigeration systems such as that used in the old Kelvinator refrigerators.

There are problems related to electrical storage battery performance that users must consider. A battery's performance is rated at a specific temperature, in the case of a lead-acid type, the most broadly used rechargeable battery, its performance is based on 77° F. and for every 15° F. rise above that battery life expectancy is reduced by one half. So in an environment whose average temperature is 122° F. (77°+3×15°) the useful life is reduced to ⅛ of the design, and at 137° F. average temperature, life expectancy is 1/16 of the original. Consequently, a battery with a five year normal life expectancy will last only 4 to 8 months in an environment whose temperature varies from 122° to 137° F. U.S. Nuclear Regulatory Agency regulation #10CFR part 50 appendix R requires emergency lighting in many plant areas where temperatures routinely exceed 100° F. In some areas temperatures even reach 132° F.

In many locations in nuclear power plants the problem is solved by locating the battery remotely from the lamps they serve. However, because failure of the electrical power source that serves the battery recharge system causes the emergency lights to illuminate, its universal application is restricted. Consequently, many plant areas require "living with the problem" and replacing units every few months.

SUMMARY OF THE INVENTION

The present invention provides improved lighting units for power outages by using thermoelectric modules to pump heat from within an insulated enclosure located in a hostile elevated temperature environment housing a battery. The use of such modules for cooling enclosures has long been known for other purposes [see for example, U.S. Pat. Nos. 2,878,875 (Lackey et al.), 3,118,285 (Malaker et al.), 3,137,142 (Venema), 3,213,630 (Mole), 3,986,337 (Richard) and 4,807,441 (Agee et al.)].

The lighting units of the present invention maintain the battery at, or near 77° F. This temperature represents the optimum performance temperature of most batteries particularly the lead-acid type. Since these are rechargeable type batteries they are routinely employed in apparatus, such as emergency lighting systems that employ solid state electronic chargers. By housing the electronic portions of the charger also in the battery controlled temperature environment inside the enclosure, the entire system's dependability is substantially enhanced. Furthermore, in order to minimize electric power consumption required by the thermoelectric cooling system's non-critical heat generating components such as transformers and power supplies are located according to the present invention outside of the refrigerated compartment, so that only wires and critical components which do not generate significant heat are in the cooled environment. It is also an object of the invention to minimize the electric power required to drive the thermoelectric heat pumps. Since thermoelectric chips are less efficient in pumping heat than mechanical gas-vapor phase cycles, care must by taken to coordinate design of the thermodynamic and electrical aspects of the apparatus to optimize this aspect. The electrical diagram and mechanical drawings of the embodiment of this invention demonstrate how this is accomplished by using a plurality of thermoelectric chips, inside chips being connected in series with each other, the outside chips being connected in series with each other, and the group of inside chips being connected in parallel with the group of outside chips. Knowing that the input electrical energy converts to heat within the chip necessitates that this also must be pumped out of the enclosure along with the internal compartment heat and the heat that leaks in thru the insulation on a continuing basis.

In certain battery cooling applications where the ambient temperature is not as extreme as may be encountered in an electric power generation plant. Only one or two thermodynamic chips may be necessary to maintain the battery at approximately 77° F., if the ambient temperature should average only 95° to 105° F., but the present preferred embodiment of the invention is for ambient temperatures that may rise as high as 140° to 150° F. and average 135° F.

To assist in heat transfer, metals of high thermal conductivity, such as aluminum or copper are used in the construction of the internal and external heat sinks (exchangers) of the invention as well as solid rectangular metallic bars to form conduits for conducting the heat being pumped from the inside to the outside of the insulated enclosure. The invention, requires no forced convection fans to remove heat from the external finned exchangers or to assist transfer of heat into the internal finned heat sinks. As previously mentioned, because of the necessity for dependable performance, moving mechanical devices are undesirable for use in emergency lighting units in nuclear power plants. The present preferred embodiment of the lighting unit of the invention has extra large heat sinks using natural convection along with the previously mentioned unique component arrangement to accomplish the cooling objective. For less stringent specifications pertaining to battery cooling apparatus appended fans may be employed to enhance heat transfer. Development work performed in the course of evolving the specific lighting unit illustrated in the accompanying drawings demonstrates that 10° to 20° F. of additional cooling may be realized with the said unit should a small electric fan impinge forced air convection against both external heat sinks.

The invention also has application where rechargeable batteries are used in other high temperature environments, such as emergency lighting systems for foundries, steel mills, tropical warehouses, for battery back-up systems for remote communication relay stations, and for engine starter batteries.

A further aspect of the invention is the heating as well as cooling of batteries, taking advantage of the capability of thermoelectric chips to change between heating and cooling when polarity of electric current through them is reversed. This is particularly important for purposes of engine starting in very cold weather where a cold battery has low cranking power but engine warming the battery can raise its power enough to start the engine.

DESCRIPTION OF THE DRAWINGS

The accompanying drawings show, for purposes of illustration only, a present preferred embodiment of the invention, in which.

DESCRIPTION OF THE PREFERRED EMBODIMENT OF THE INVENTION

Figure 1:
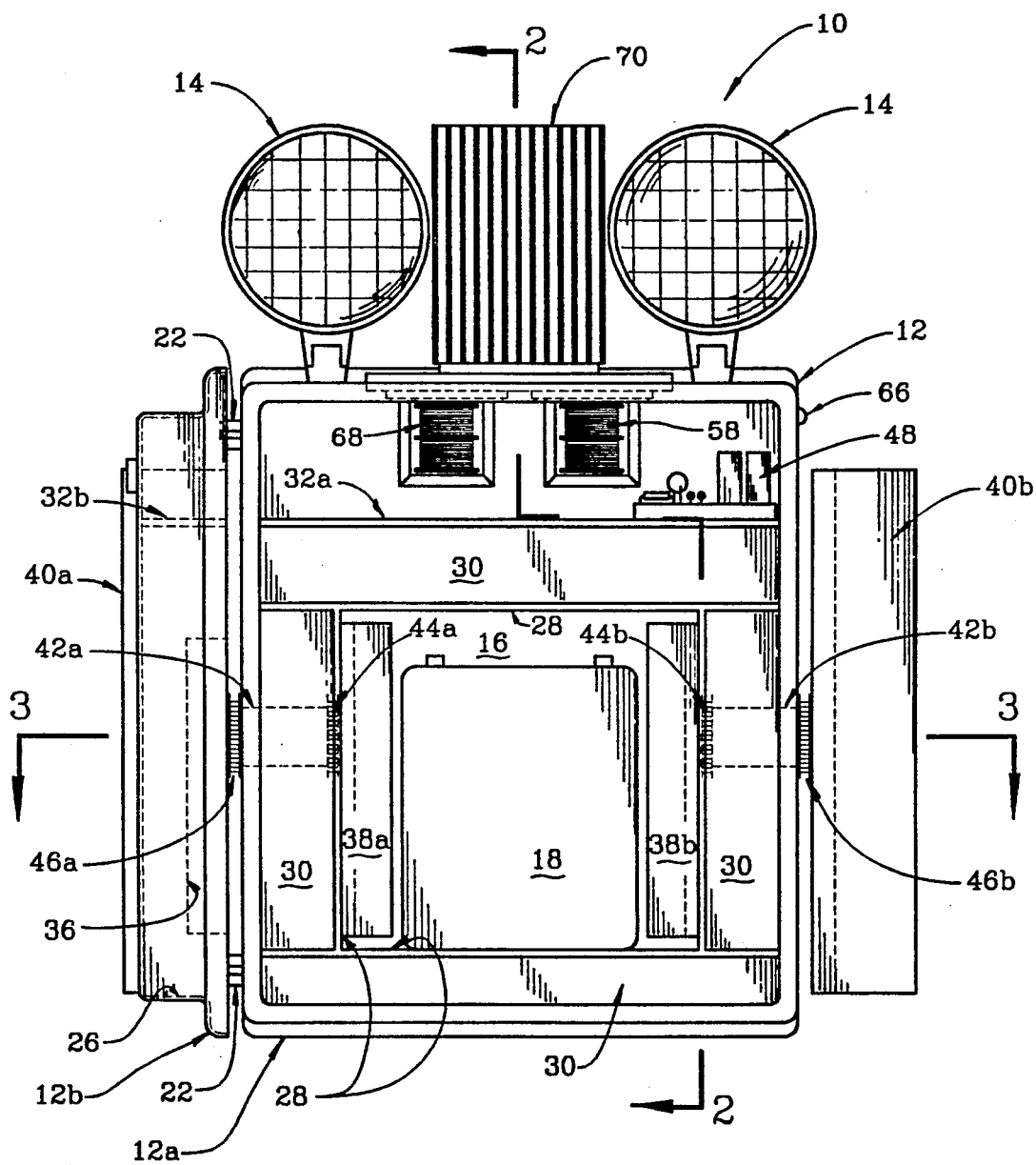
FIG. 1 shows a front elevation view of a lighting unit for power outage in accordance with the invention.
Figure 2:
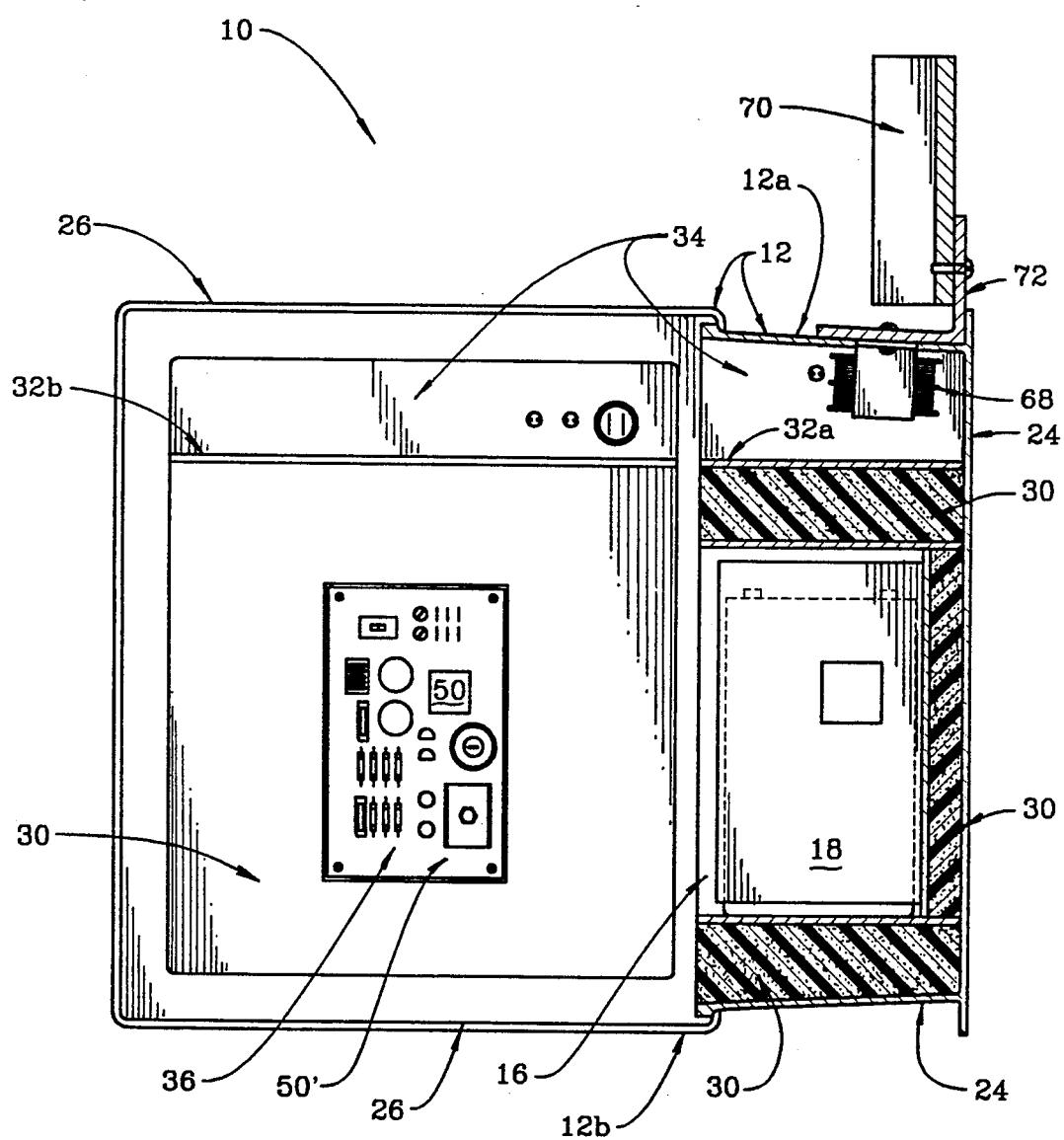
FIG. 2 shows a section on the line 2—2 in FIG. 1.
Figure 3:
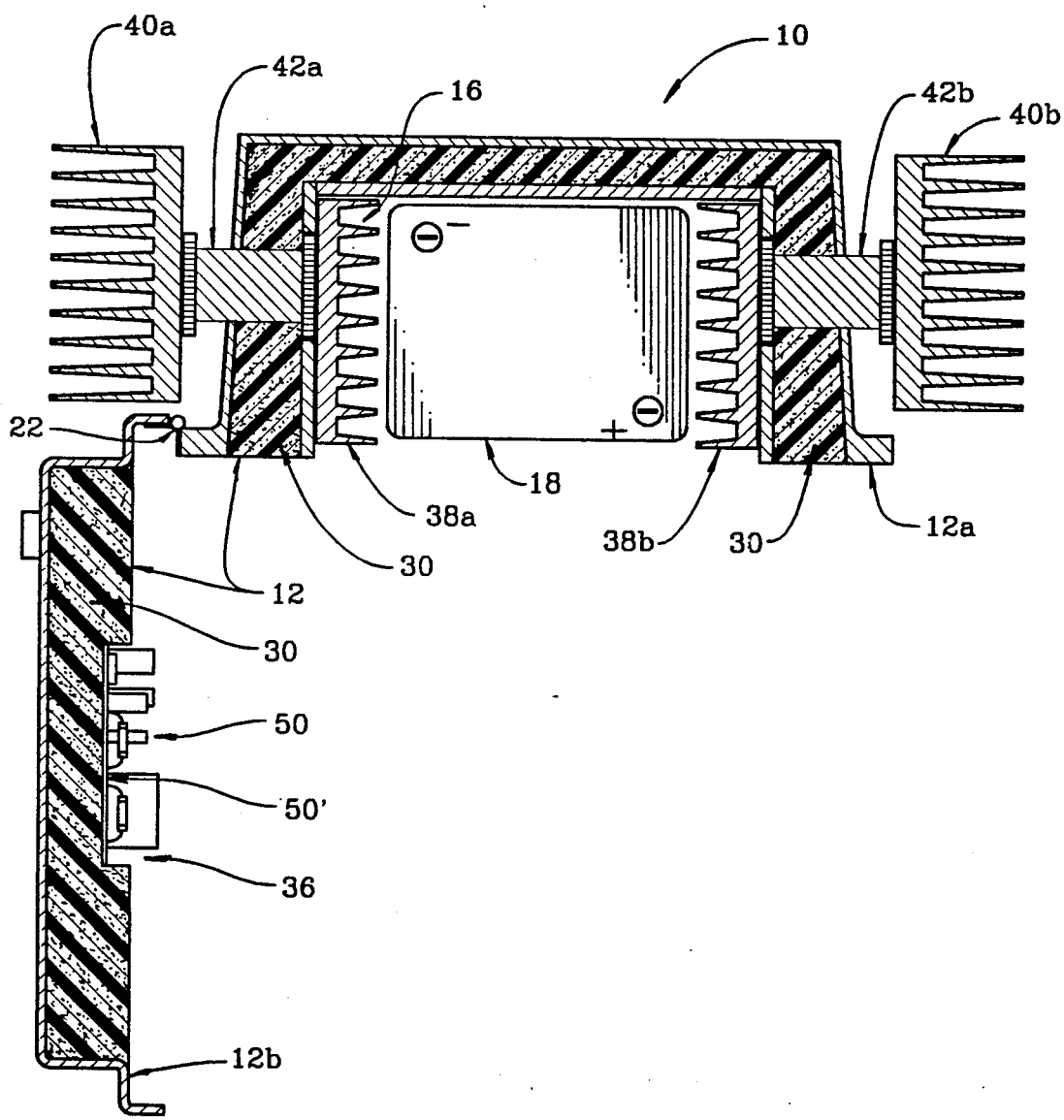
FIG. 3 shows a section on the line 3—3 in FIG. 1 (omitting lamps shown in FIG. 1)

Referring now more particularly to the drawings, and initially to FIGS 1-3, a lighting unit 10 in accordance with the invention has a cabinet 12 on which there are mounted a pair of lamps 14, and within which there is an insulated compartment 16 housing a battery 18. The unit is connected to a 110 AC power line 20, for the purpose of providing a source of light when power fails in the line. When power is on the lights are turned off, and the line power keeps the battery charged and also cools compartment 16 to a predetermined temperature suitable for prolonging the battery life.

Cabinet 12 has a main body portion 12a and a door 12b which closes to cover and seal around the periphery of one side of body portion 12a and which opens to expose and permit access to said one side Hinges 22 connect one side of the door to an adjacent side of the cabinet body.

A shell 24, preferably of reinforced fiberglass, extends around the outside of cabinet body 12, except where door 12b covers one side of body 12a. A shell 26, also preferably of fiberglass, extends around the outside of door 12b. The inside of compartment 16 is lined with non-metallic composition sheet support panels 28, except where it is covered by door 12b. Rigid and thermally-insulative polymeric foam 30 fills the spaces between panels 28 and body shell 24, except above the top horizontal panel 28 (FIG. 1), where an equally thick layer of foam 30 extends between that panel and a deck panel 32a of reinforced fiberglass sheet which extends horizontally across the whole area within shell 24. A corresponding deck 32b extends at the same level horizontally across the whole area within the upper part of door shell 26, so that when door 12b is closed a compartment 34 is enclosed within the upper parts of shells 24 and 26 above decks 32a and -b.

Foam 30 also lines the inside of door shell 26 below the level of deck 32b, to complete the insulation surrounding battery compartment 16 when the door is closed. The foam in door 12b is indented to form a shallow rectangular cavity 36 opening toward the interior of compartment 16.

Temperature is controlled in compartment 16 by a pair of finned aluminum heat sinks 38a and 38b in the compartment on opposite sides of battery 18; by a pair of larger finned aluminum heat sinks 40a and 40b mounted outside of opposite side of cabinet 12; by a pair of aluminum bars 42a and 42b extending through the foam 30, panels 28 and shell 24 of said sides; and by a pair of thermoelectric heat pump chips 44a and 44b connected between the outer ends of conductor bars 42a and -b and outer heat sinks 40a and -b.

Figure 4:
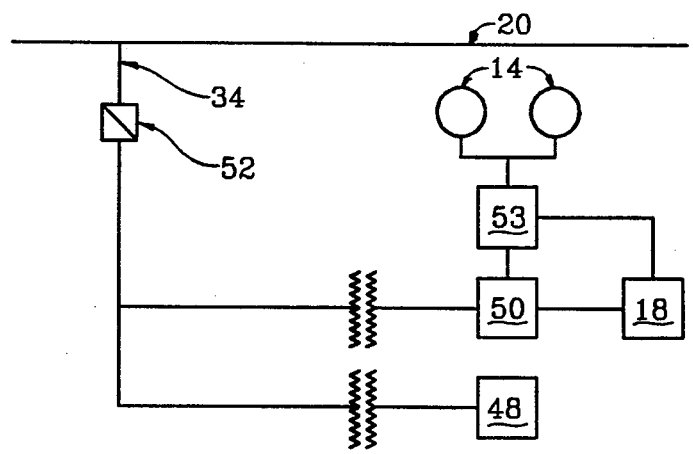
FIG. 4 shows schematic line circuit for the unit shown in FIG. 1.
Figure 5:
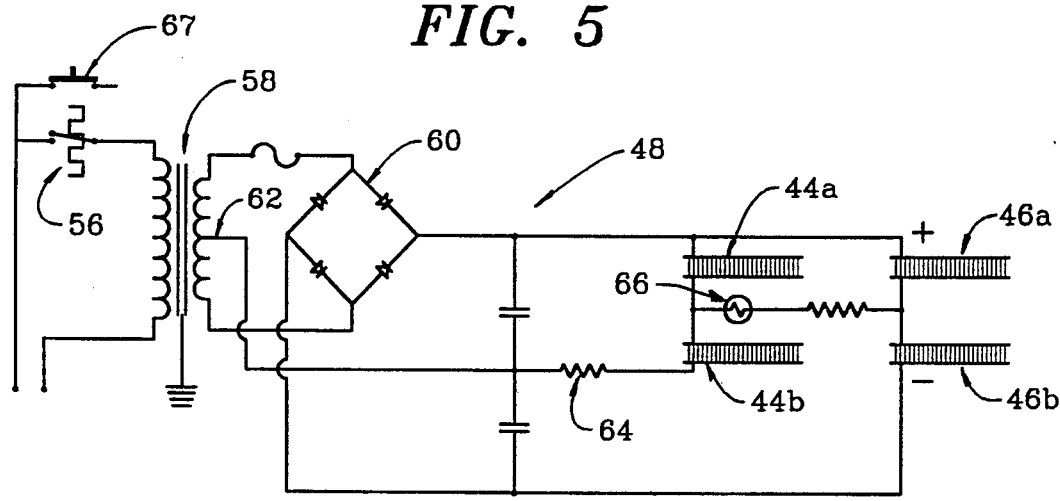
FIG. 5 shows a circuit for the cooling system in the circuit of FIG. 4.

As shown in FIGS. 4 and 5, power to cool battery compartment 16 is received by a power supply circuit 48 which is connected to power line 20 in parallel with a power supply circuit 50 for charging battery 18. The connection is through a disconnectable connection 52 in a branch 34 leading from line 20 to power circuit 48 and 50. A relay switch 53 connects battery 18 to lamps 14 to light them when charging circuit 50 loses power and breaks the connection to turn off lamps when circuit 50 is powered from branch 54 and line 2.

Circuit 48 (FIG. 5) has a thermostat switch 56 which responds to changes in temperature above and below a preset range (preferably 72° F. to 82° F.) to activate the circuit when the temperature in compartment 16 is too high and to deactivate it when it is too low. A transformer 58 steps down the circuit voltage and rectifier bridge 60 changes it from AC to DC. The output of the rectifier passes through the outside chips 46a and -b in series without reduction in voltage, but passes through the inside chips 44a and -b in series at a reducted voltage (preferably 50%). To reduce the voltage the return line from chips 44a and -b is through a center tap 62 into the center of the secondary coil of the transformer 58, whereas the return line from chips 46a and -b is to the end of rectifier bridge 60 opposite to its output end. Also, the two pairs of series connected chips are connected in parallel with each other to the rectifier output. A low ohmic balancing resistor 64 is in series with center tap 62 to establish the precise voltage ratio.

In the embodiment shown herein an outboard voltage measured across the two chips was selected at 16.8 VDC and experiments performed showed best overall cooling performance to be attained using 8.0 VDC across the two inboard chips 38a and -b. Other experiments performed showed that to achieve best overall performance, the voltages selected were critically linked to the size of the heat sinks 38 and 42, as well as the quality and construction of the insulation 12 and the integrity of the enclosure 16. In the embodiment of this invention differential temperatures of 40°-45° F. were readily achieved between ambient and internal chamber 44 improving battery life by as much as 8× in hostile temperature environments.

A light emitting diode 66 and its protective resistor are connected across the line between chips 44a and 44b and the line between chips 46a and -b. The diode is mounted to be visible outside of cabinet 12, in order to show when the cooling system is operating.

A refrigeration system test push button 67 (FIG. 5) is used to temporarily activate the cooling system of the embodiment shown herein. When the cooling circuit 48 is energized, indicator light 66 illuminates. However, when the unit 10 is in an environment lower than 82° F., thermostat switch 56 is open, so power is not supplied to the chips for cooling. Therefore, to test the unit's readiness under these conditions the closing of push button 67 is necessary.

The electrical elements that generate substantial heat are housed in the upper compartment 34, which is substantially uninsulated. These elements are the transformer 58 (FIG. 1) in the circuit 48 (FIG. 5) which powers the thermoelectric chips 44a and -b and 46a and -b, and a transformer 68 (FIG. 1) in the conventional circuit 50 for charging battery 18. The remaining components of circuit 48 (shown at 48' in FIG. 5) are also in compartment 34, where they function satisfactorily. The remaining components of the battery charging circuit 50 are on a circuit board 50' shown in FIG. 2, would alter the rate of charging the battery if exposed to temperatures rising substantially above 80° F., thereby shortening the battery life. Circuit board 50' is accordingly housed in cavity 36, where the temperatures of its components are controlled by cooling circuit 48. Circuit board 50' corresponds to the board 42-33105900 used in the Exide "Lightguard" F100 and F100RT emergency lighting unit.

A finned aluminum heatsink 70 (FIGS. 1 and 2) extends above the outside of cabinet 12 to dissipate to the atmosphere by conduction and radiation the heat generated within the upper compartment 34 by transformers 58 and 68, thereby reducing power consumed by cooling circuit 48. An aluminum L-shaped support 72 is bolted to the transformers and to heatsink 70 to conduct the heat of the transformers to the heatsink (FIG. 2). An opening is cut through the top of cabinet 12 to put the iron cores of the transformers in metal-to-metal contact with support 72, for better thermal conduction.

The chips used in unit 10 are preferably of the 1×1×⅛ size, and may be obtained from Material Products Corporation, 990 Spruce Street, Trenton, N.J. 08638 and Marlow Industries Inc., 10451 Vista Park Road, Dallas, Tex. 75238.

Figure 6:
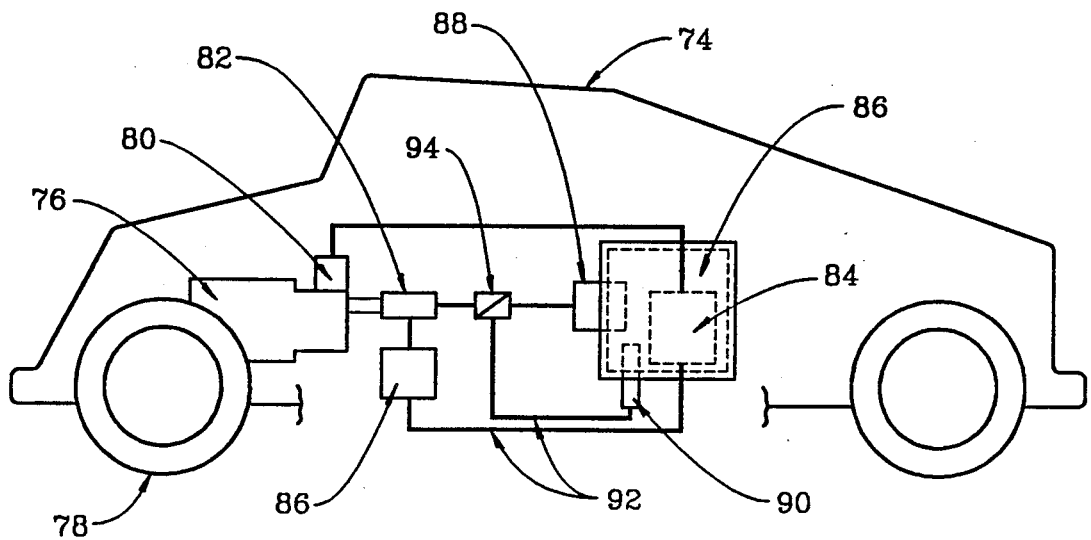
FIG. 6 shows a diagrammatic view of an automobile modified in accordance with the invention.

Referring now to FIG. 6, an automobile 74 has an internal combustion engine 76 connected to drive wheels 78, an engine starter 80, an electric generator 82 driven by the engine, a battery 84 connected to operate the starter to start the engine, and a battery charger 86 energized by the generator 82 and connected to charge the battery 84, all of conventional design and function.

An insulated compartment 86 encloses battery 84 and a voltage regulator in the charger circuit, and opens to permit access to them. A thermoelectric system 88 cools compartment 86 by the means described above with reference to cooling compartment 16 in FIGS. 1-3. Generator 80 powers thermoelectric system 88 for cooling compartment 86 by pumping heat out of it when the surrounding temperature is high enough to reduce battery life. When the surrounding temperature is so low as to reduce cranking power of the engine, a thermostat 90 in a circuit 92 operates a switch 94 to connect battery 84 to power thermoelectric system 88 with a polarity opposite to that supplied by generator 82. This causes the thermoelectric system to pump heat into compartment 86 instead of out of it, and causes the battery to warm itself when it is cold, thereby increasing its cranking power for cold starting the engine.

While present preferred embodiments and practices of the invention have been illustrated and described, it will be understood that it may be otherwise variously embodied and practiced within the scope of the following claims.

We claim:

1. A power outage lighting unit, comprising a cabinet, lighting means mounted on the cabinet, an insulated compartment in the cabinet adapted to hold a battery for powering the lighting means, means for receiving alternating electric current from a power line and supplying direct current at a lower voltage to charge a battery in said compartment, means connecting the battery to operate said lighting means when power is not received by the unit from a power line and to disconnect the battery from the lighting means when power is being received by the unit from a power line, and means to cool the battery compartment while power is being received by the unit from a power line, said cooling means comprising thermoelectric means inside of the insulated compartment for pumping heat out of the compartment, thermoelectric means adjacent to the outside of the cabinet, means to receive heat from said outside thermoelectric means and dissipate it to the atmosphere, thermally conductive means connecting said inside thermoelectric means to said outside thermoelectric means, and means for receiving alternating electric current from a power line and supplying direct current to power said inside and outside thermoelectric means.

2. A power outage lighting unit in accordance with claim 1, in which the outside thermoelectric means is effective to pump heat at a higher rate than the inside thermoelectric means while cooling the battery compartment.

3. A power outage lighting unit in accordance with claim 2, in which the power supply means for the inside and outside thermoelectric means comprises a voltage transformer, a current rectifier, a line connecting the rectifier in parallel to the inside and outside thermoelectric means, a return line from the outside thermoelectric means to the rectifier, and a return line from the inside thermoelectric means to an intermediate place along the secondary coil of the transformer.

4. A power outage lighting unit in accordance with claim 3, in which said intermediate place is about half way along said secondary coil, and the inside thermoelectric means pumps heat at about half the rate of the outside thermoelectric means.

5. A power outage lighting unit in accordance with claim 1, in which the cabinet contains a second compartment outside of the insulation protecting the insulated compartment, in which the power supply means for battery charging and the power supply means for cooling the insulated compartment comprises a pair of voltage step down transformers, in which said transformers are mounted in said second compartment, and which comprises means outside of the cabinet to dissipate heat to the atmosphere and thermally conductive means connecting said heat dissipating means to said transformers.

6. A power outage lighting unit in accordance with claim 1, in which the means for supplying power to charge a battery in the insulated compartment comprises voltage regulating means on a circuit board and means mounting the circuit board within the insulated compartment.

* * * * *